United States Patent [19]

Inoue

[11] 4,106,078
[45] Aug. 8, 1978

[54] LIGHT SOURCE SYSTEM

[75] Inventor: Yasuo Inoue, Hachioji, Japan

[73] Assignee: Olympus Optical Company Limited, Tokyo, Japan

[21] Appl. No.: 751,946

[22] Filed: Dec. 17, 1976

[30] Foreign Application Priority Data

Dec. 27, 1975 [JP] Japan .............................. 51-157115

[51] Int. Cl.² .............................................. F21V 7/04
[52] U.S. Cl. ...................................... 362/32; 362/327
[58] Field of Search ................ 240/11 P, 41.3, 2 MA; 350/96 R, 87

[56] References Cited

U.S. PATENT DOCUMENTS

| 3,669,524 | 6/1972 | Shio | 350/87 |
| 3,710,091 | 1/1973 | Holcomb | 240/2 MA |
| 3,926,501 | 12/1975 | Hama | 350/96 R |
| 3,971,621 | 7/1976 | Albrecht-Buehler | 240/2 MA |

Primary Examiner—Richard L. Moses
Attorney, Agent, or Firm—Toren, McGeady and Stanger

[57] ABSTRACT

A light source system for use in a lighting device of a microscope comprises an elliptical cylindrical concave reflecting mirror, a linear light emitter arranged at one focus position of the mirror, a cylindrical condenser lens arranged at the opening position of the mirror and a bundle of optical fibers. A part of the end surfaces of the fiber bundle is arranged at the condensing position of the portion of the light from the emitter reflected by the mirror and refracted by the condenser lens. The other part of end surfaces of the fiber bundle is arranged at the condensing position of the portion of the light from the emitter directly refracted by the condenser lens.

3 Claims, 5 Drawing Figures 4,106,078

LIGHT SOURCE SYSTEM

BACKGROUND OF THE INVENTION

1. Field of the Invention

The present invention relates to a light source system for converting a linear light source to a surface light source.

2. Description of the Prior Art

It has been well known to use a linear discharge tube as a lighting source of a microscope because the discharge tube, such as a mercury lamp, has a large amount of light which is desired for the lighting source of the microscope. Such discharge tube can also provides light having a desired wave length. As shown in FIG. 1, the known light source comprises a collector lens 2 having a large aperture in front of a discharge tube 1. Such light source must obtain a predetermined amount of light from the light emitted from a small area shown with reference numeral 1a as a part of the discharge tube 1, so that a large amount of light is lost and heat generation is increased, and as a result, an expensive quartz tube should be used as a discharge tube. In the case of carrying out automatic dimming with the use of a strobo discharge tube, if a distance between electrodes is short, a circuit becomes complicated since an internal impedance of the tube is low and the present technique cannot adjust light.

In addition to this kind of light source systems, there is a system in which a cylindrical lens is used as a lens arranged in front of a discharge tube, thereby reducing magnification in the longitudinal direction, converting a light source similar to a square, and utilizating light from the light source efficiently. Such system, however, is not preferable because illumination blurs are caused if a frosted filter having strong diffusibility is not placed at the image plane.

A light source system is also contemplated wherein the periphery of a discharge tube is covered with one end surface of a bundle of optical fibers, the other end thereof is matched with the necessary surface, and light from the light source is efficiently taken out. In such illuminating system, however, heat radiation is much worse, so that when a large capacity of a strobo is used for a short time interval, forced water cooling is required having a complicated structure. If the inner diameter of an optical fiber bundle is made large for a heat radiation counterplan, the number of optical fibers is increased in proportion to the diameter.

SUMMARY OF THE INVENTION

An object of the present invention is to eliminate the above described defects of the conventional light source system.

Another object of the present invention is to provide an illuminating system with high efficiency in which a linear discharge tube is used.

According to the present invention, the light source system comprises a semi-elliptical cylindrical concave reflecting mirror, a linear light emitter arranged at one focus position of the concave reflecting mirror, a cylindrical condenser lens arranged at the opening position of the reflecting mirror, and a bundle of optical fibers. A part of the end surfaces of the fiber bundle is arranged at the condensing position of light portion of the light from the emitter reflected by the reflecting mirror and refracted by the condenser lens. The other part of the end surfaces of the fiber bundle is arranged at the condensing position of light portion of the light from the emitter directly refracted by the condenser lens.

According to the another embodiment of the present invention a small opening is formed at the opposite side to the opening of the reflecting mirror. Another cylindrical condenser lens and an auxiliary light source are arranged at the outside of the mirror. The auxiliary light source is arranged at the optically conjugate position with the light emitter to the other cylindrical condenser lens.

DESCRIPTION OF THE PREFERRED EMBODIMENT

Figure 1:
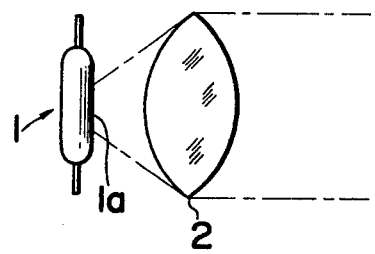
FIG. 1 is a cross-sectional view of a conventional light source system.

The principle of the illuminating system according to the present invention will be explained with reference to the accompanying drawings. In FIGS. 2A and 2B are shown cross-sectional views of a discharge tube, each cutting in the longitudinal direction and the vertical direction, respectively, in which reference numeral 11 is a discharge tube, numeral 12 is a cylindrical reflecting mirror cross-section of which is semi-elliptical as shown in FIG. 2B, and at the focal plane of the reflecting mirror 12 is arranged the discharge tube 11. Reference numeral 13 is a bundle of optical fibers, its one end surface 13a is arranged at the position where light emitted from the discharge tube 11 and reflected by the semi-elliptical cylindrical reflecting mirror 12 is condensed, and a cross-section of the end surface 13a is long rectangular. The other end portion 13b has an optional shape in accordance with use.

Figure 2:
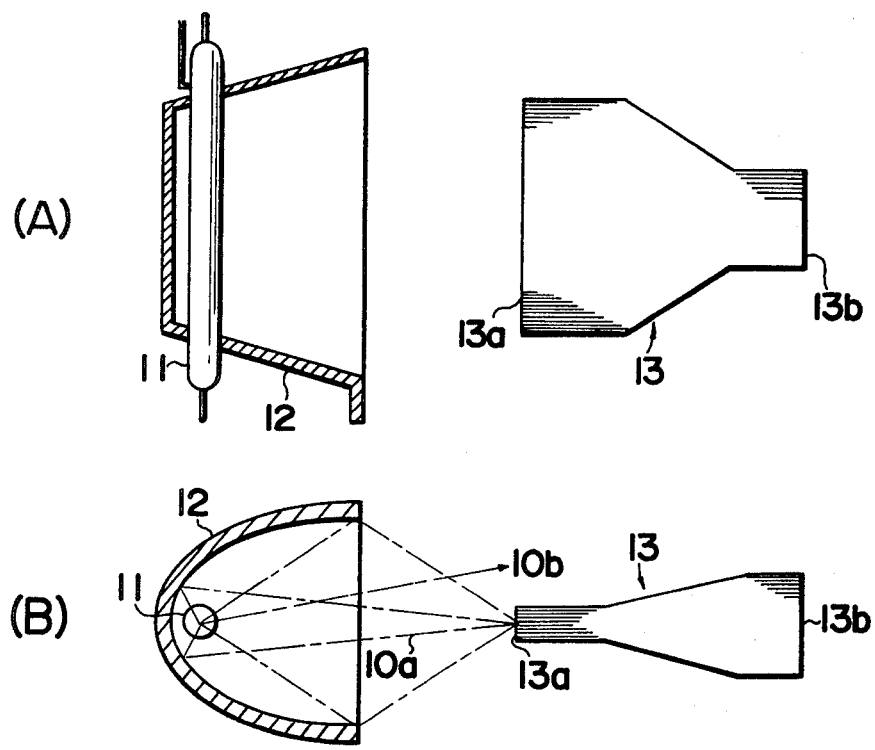
FIG. 2 is a cross-sectional view illustrating the principle of a light source according to the present invention.

According to the illuminating system having the construction shown in FIG. 2, considerably amount of light emitted from the discharge tube 11 is reflected by a reflecting surface of the semi-elliptical cylindrical reflecting mirror 12, entered into one end surface 13a of the optical fiber bundle 13 and radiated from the other end 13b. Therefore, the light from the discharge tube 1 is comparatively efficient and usable with an optional shape corresponding to use without causing any illumination blurs. However, according to the illuminating system having such construction, light transmitting in the direction of 10a among the light emitted from the discharge tube 11 is reflected by the semi-elliptical cylindrical reflecting mirror 12 and condensed at the end surface 13a of the optical fiber bundle 13, but almost all light transmitting in the direction of 10b is not entered into the end surface 13a of the optical fiber bundle 13, so that its efficiency is still insufficient.

Figure 3:
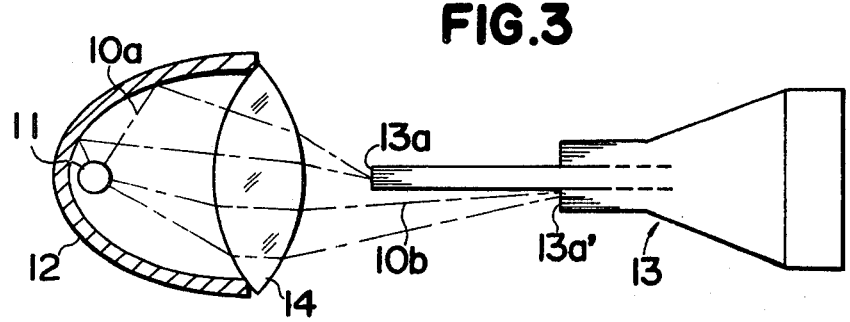
FIGS. 3-5 are cross-sectional views showing each embodiment of the light source system according to the present invention.

The present invention applies the above idea of the illuminating system and utilizes the light which is not reflected on the reflecting mirror shown by reference numeral 10b in FIG. 2 nor condensed to the end surface 13a of the optical fiber bundle 13. That is, as shown in FIG. 3, a condenser lens 14 is arranged at an opening portion of the semi-elliptical cylindrical reflecting mirror 12 so as to condense the aforementioned light 10b. In such a case, the light transmitting in the direction of 10a is further converged by the condenser lens, and the position for condensing these lights is shifted. The position for condensing the light 10a reflected by the reflecting mirror 12 differs from the position for condensing the light transmitting in the direction of 10b. Therefore, one end portion of the optical fiber bundle 13 is divided into two of an end surface shown by 13a and an end surface shown by 13a'. One end surface 13a is positioned at the place where the light reflected from the semi-elliptical cylindrical reflecting mirror 12 is condensed, while the other end surface 13a' is positioned at the place where the light is not reflected but condensed by the cylindrical lens 14.

The light from the linear discharge tube is then efficiently utilized as an illuminating light.

Figure 4:
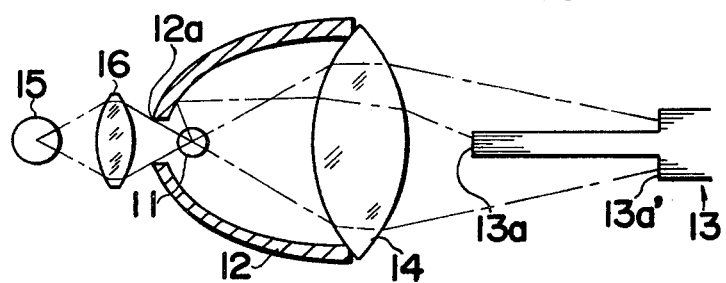

In FIG. 4 is shown another embodiment of the present invention, in which at the position (left side) opposite to the opening of the semi-elliptical cylindrical reflecting mirror 12 is provided the other narrow opening 12a, at the outside of which is arranged an auxiliary linear light source 15 such as lighting source and a cylindrical lens 16. According to this embodiment, light from the auxiliary light source is also entered into the end surfaces 13a, 13a' of the optical fiber bundle as well as the light from the discharge tube 11 such as flash lamp.

Figure 5:
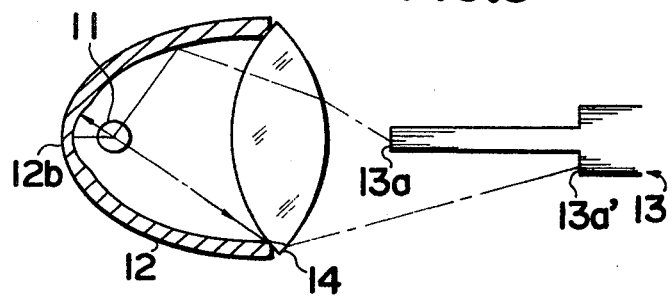

FIG. 5 shows a third embodiment of the present invention. In this embodiment, reference numeral 12b is a cylindrical concave mirror having a center occupied by the light source 1. The embodiment shown in FIG. 3 is that the light emitted from the discharge tube 11 and reflected on the side opposite to the opening (left side) of the semi-elliptical cylindrical reflecting mirror is reflected on the surface of the discharge tube 11 and does not reach each end surface 13a, 13a' of the optical fiber bundle, but in this embodiment, the light reflected by the cylindrical concave mirror 12b is again back to the direction of the discharge tube 11 and reaches the end surfaces 13a, 13a' of the optical fiber bundle 13, so that the light of the light source is more efficiently utilized.

As explained in the foregoing, according to the light source system of the present invention, almost all light emitted from the linear light emitter is effectively used, and with the use of the optical fiber bundle illuminating light having each kind of various shapes can efficiently be obtained. From the above facts, the following many advantageous effects can be performed.

(1) Since the light from the light emitter can effectively used, when a rating of the electric power supply source is the same, a stronger illuminating light can be obtained. Further, if a light amount of the illuminating light is the same, a light amount of the light emitter can be reduced and the electric power supply source can be minimized.

(2) Since the light emitter can be minimized, an amount of generated heat can be reduced and continuous use becomes possible.

(3) Both the light emitter and the electric circuit are reasonably made, so that their lives are prolonged.

(4) The long light emitter can be used, so that in case of a strobo discharge tube, an internal impedance is sufficiently taken and automatic dimming strobo can be performed.

(5) With the use of an optical fiber bundle, illumination having each kind of shapes can be obtained such as annular illumination and the like for a fundus camera.

(6) Even if there is any illumination blurs at the incident side of the fiber bundle, if arrangement of the bundles is properly changed, the incident light can be obtained as an illuminating light without blurs.

(7) According to the 2nd embodiment, focalization becomes possible by making a good use of the above described advantages. Further, with the use of an auxiliary light source, an auxiliary illumination under the same condition as that of the linear light emitter can be carried out by comparing the auxiliary source with the main source, and the illumination blurs, blackening of the light emitter, broken fiber bundle and the like can be checked.

(8) According to the 3rd embodiment, more efficient illumination becomes possible.

Further, as the cylindrical condenser lens, a cylindrical FURENEL lens can be used.

What is claimed is:

1. A light source system comprising a concave reflecting mirror of semi-elliptical and cylindrical shape, a linear light emitter arranged at one focus position of the mirror, a cylindrical condenser lens arranged at the opening position of the mirror, a bundle of optical fibers, one part of one end surface of the fiber bundle being arranged at a condensing position of the portion of the light from the emitter reflected by the mirror and refracted by the condenser lens and the other part of one end surface of the fiber bundle being arranged at a condensing position of the portion of the light from the emitter directly refracted by the condenser lens without reflection from the mirror.

2. A light source system as claimed in claim 1, wherein another small opening is formed at the opposite side of the reflecting mirror to its large opening, and at the outside of the small opening are provided another cylindrical condenser lens and an auxiliary light source arranged at the optically conjugate position with the light emitter to the another cylindrical condenser lens.

3. A light source system as claimed in claim 1, wherein the opposite side of the concave reflecting mirror to its opening is formed in the shape of a cylindrical concave mirror having a section of circular arc.

* * * * *